(12) United States Patent
Chander et al.

(10) Patent No.: US 11,528,078 B1
(45) Date of Patent: Dec. 13, 2022

(54) REORDERING A LIST OF RESTORATION PATHS BASED ON RETUNING PENALTIES

(71) Applicant: Ciena Corporation, Hanover, MD (US)

(72) Inventors: Vikas Chander, Sonipat (IN); Manish Aggarwal, New Delhi (IN); Sandeep Kumar Gupta, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/371,292

(22) Filed: Jul. 9, 2021

(30) Foreign Application Priority Data

May 27, 2021 (IN) .............................. 202111023544

(51) Int. Cl.
*H04B 10/038* (2013.01)
*H04L 45/00* (2022.01)

(52) U.S. Cl.
CPC ........... *H04B 10/038* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 5,777,761 A * | 7/1998 | Fee | H04J 14/0291 398/1 |
| 6,690,884 B1 * | 2/2004 | Kelty | H04B 10/695 714/704 |
| 7,522,846 B1 | 4/2009 | Lewis et al. | |
| 7,894,721 B2 | 2/2011 | Roberts et al. | |
| 8,364,036 B2 | 1/2013 | Boertjes et al. | |
| 8,457,497 B2 | 6/2013 | Zhong et al. | |
| 9,060,215 B2 | 6/2015 | Miedema | |
| 9,590,731 B2 | 3/2017 | Roberts et al. | |
| 9,768,902 B2 | 9/2017 | Al Sayeed et al. | |
| 9,838,296 B2 | 12/2017 | Armolavicius et al. | |
| 10,003,867 B2 | 6/2018 | Prakash et al. | |
| 10,194,221 B2 | 1/2019 | Frankel et al. | |
| 10,237,011 B2 | 3/2019 | Al Sayeed et al. | |
| 10,298,356 B1 | 5/2019 | Châtelain et al. | |
| 10,411,806 B2 | 9/2019 | Prakash et al. | |
| 10,686,543 B1 | 6/2020 | Al Sayeed et al. | |
| 10,735,837 B1 | 8/2020 | Al Sayeed et al. | |
| 10,749,602 B2 | 8/2020 | Charlton et al. | |
| 10,958,993 B2 | 3/2021 | Swinkels et al. | |
| 2003/0215231 A1 * | 11/2003 | Weston-Dawkes | H04J 14/0238 398/19 |

(Continued)

*Primary Examiner* — Darren E Wolf
(74) *Attorney, Agent, or Firm* — Clements Bernard Baratta; Lawrence A. Baratta, Jr.; Christopher L. Bernard

(57) ABSTRACT

Systems and methods for managing a list or restoration paths are provided. A method, according to one implementation, includes obtaining a list of restoration paths used for restoring transmission in a network when a home path between an originating node and a termination node is unavailable. The restoration paths are listed in a specific order based on ongoing transmission costs, where the ongoing transmission cost for each restoration path is based on characteristics associated with transmitting signals along the respective restoration path. The method also includes the step of reordering the restoration paths in the list based on restoration costs and the ongoing transmission costs. The restoration cost for each restoration path is based on a procedure for switching from the home path to the respective restoration path.

18 Claims, 8 Drawing Sheets

(56) References Cited

U.S. PATENT DOCUMENTS

| | | | |
|---|---|---|---|
| 2004/0130778 A1* | 7/2004 | Smith | H04B 10/2935 |
| | | | 359/337 |
| 2005/0185654 A1* | 8/2005 | Zadikian | H04L 47/748 |
| | | | 370/395.21 |
| 2006/0120718 A1* | 6/2006 | Natori | H04J 14/0295 |
| | | | 398/19 |
| 2009/0214215 A1* | 8/2009 | Li | H04B 10/2507 |
| | | | 398/43 |
| 2014/0169187 A1* | 6/2014 | Jenkins | H04L 41/145 |
| | | | 370/252 |

* cited by examiner

US 11,528,078 B1

REORDERING A LIST OF RESTORATION PATHS BASED ON RETUNING PENALTIES

TECHNICAL FIELD

The present disclosure generally relates to networking systems and methods. More particularly, the present disclosure relates to alternative restoration paths used as backup paths in a network and reordering a priority list of the restoration paths based on retuning penalties.

BACKGROUND

Generally, in a Layer 0 Control Plane (L0CP) for controlling data transmission routes in an optical (or photonic) network, a main route (or primary path) may be established as having the highest priority. Thus, when there are no faults on this main route, the L0CP will maintain transmission along this preferred route. Many networks will often have backup routes (or restoration paths) that can be used as secondary paths to restore data transmission when a fault is detected on the main or preferred route.

A typical restoration procedure involves switching from the primary route to a backup route. Normally, whenever a restoration procedure is enacted because of a fault, the L0CP system may compute a path using a Path Computation Engine (PCE) or have precomputed paths, which may include implementing a Designated Transit List (DTL) provisioning process to implicitly list a number of backup paths, where the list may include an order (e.g., based on priority) of the backup paths. The backup path that is highest on the list will be attempted first during the restoration procedure. If that path is unavailable for any reason, then the next backup path on the DTL can be used for restoration. An alternative restoration procedure may include a first explicitly configured valid alternative path (e.g., in case of explicit DTL provisioning).

Conventional L0CP systems normally determine the list of backup paths in the DTL based on a Shortest Path First (SPF) criteria or other various criteria based on ongoing (or long term) parameters (e.g., latency, cost, etc.). However, these conventional systems are not equipped to determine DTLs based on the initial cost of switching (or rerouting) from the main route to the backup route. Instead, a network manager (or other user) can only configure either explicit backup paths or allow a PCE to implicitly calculate a new restoration path.

One of the consequences of rerouting to a backup path based solely on long-term or ongoing criteria is that there may be a higher initial cost that is incurred during this initial restoration procedure in the conventional systems. For example, restoration to some backup paths may require a significant amount of retuning from one frequency to another. Some retuning processes may cause long lags or delays of about one or two minutes, which can be unacceptable in many situations, such as where fast restoration is required. Thus, when an optical network is operating in the colorless domain, conventional systems do not normally take into account this initial service delay needed to restore data transmission paths. Therefore, there is a need in the field of optical or photonic networks (e.g., colorless systems) to consider not only the ongoing transmission cost (e.g., latency) with respect to backup paths, but also to consider the initial restoration costs (e.g., retuning) when the available frequencies (e.g., optical channels) of the backup paths differ from the operating frequencies of the primary path.

BRIEF SUMMARY

The present disclosure is directed to systems, methods, and non-transitory computer-readable media for managing a specific order of restoration paths in a list where the order is used for determining which restoration path to attempt if a main (primary) path goes down. A system, according to one implementation of the present disclosure, includes a processing device and a memory device, where the memory device is configured to store a computer program having various computer-executable instructions. When executed, the instructions enable the processing device to obtain a list of restoration paths used for restoring transmission in a network when a home path between an originating node and a termination node is unavailable. The restoration paths are listed in a specific order based on ongoing transmission costs, whereby the ongoing transmission cost for each restoration path is based on characteristics associated with transmitting signals along the respective restoration path. The instructions further enable the processing device to reorder the restoration paths in the list based on restoration costs and the ongoing transmission costs. The restoration cost for each restoration path may be based on a procedure for switching from the home path to the respective restoration path.

In addition, the restoration cost for each restoration path may be related to a home frequency associated with the home path and a restoration frequency related to one or more available transmission channels on the respective restoration path. The restoration cost of each restoration path may be based, for example, on a retuning procedure for retuning a modem from the home frequency to the respective restoration frequency when there is frequency contention between the home frequency and the respective restoration frequency. The restoration cost of each restoration path may be based on a time needed to perform the retuning procedure. Also, the home frequency and the restoration frequencies may be center frequencies of optical transmission channels. Furthermore, the instructions may further enable the processing device to store vectors including frequencies and restoration costs in the memory device.

Also, the computer-executable instructions may further enable the processing device to add a first parameter (MIN_RETUNE) to a Layer 0 Control Plane (L0CP) Optical Switching and Routing Protocol (OSRP) for allowing a user to enable or disable a characteristic for reordering the restoration paths based on restoration costs. The instructions may also enable the processing device to add a second parameter (RETUNE_PENALTY) to the L0CP OSRP for allowing the user to enter an acceptable limit for the ongoing transmission cost for each of the restoration paths that have no restoration costs. The second parameter (RETUNE_PENALTY) may also allow the user to add one or more constraints, such as home path diversity, shared path diversity, and/or maximum ongoing transmission costs.

Furthermore, the instructions may further enable the processing device to use one or more of explicit path configuration procedures and implicit path configuration procedures. In various implementations, the system may be incorporated in a centralized Network Management System (NMS) Path Computation Engine (PCE) system and/or a localized Network Element (NE) PCE system. The centralized NMS PCE system, for example, may be configured for offline operation and/or online operation.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for performing restoration procedures in a communications network. In an optical network, particularly operating in a colorless domain, modems may be tunable, which means that they can change their wavelength (or frequency, spectrum, etc.). As described herein, a modem may also be a transceiver, a transponder, a transmitter/receiver, etc. However, since this retuning process can take a significant amount of time to change from one wavelength to another (e.g., about one to two minutes in some cases), the present disclosure describes various embodiments for considering the impact that this retuning process can have on the overall cost of restoring network traffic. Thus, the embodiments of the present disclosure are configured to consider not only the ongoing transmission costs of restoring traffic, but also the initial costs of restoring traffic. Particularly, one goal of the present embodiments is to minimize the amount of down time during these restoration procedures.

Again, conventional Layer 0 (photonic layer) Control Plane (L0CP) networks can implicitly or explicitly compute backup paths, but these paths are only based on ongoing transmission costs. The conventional systems to take initial restoration costs into consideration. Thus, the typical rules for determining a priority order of backup backs are applied, regardless of any retuning that may be needed. The conventional rules are applied even if the center frequency (on the primary path on which services are running) is not available on the chosen restoration path. In the colorless domain, a system may switch to a backup path where retuning is needed, which adds additional tuning time to the overall restoration. Therefore, by neglecting the retuning time/cost, the conventional systems may unintentionally be selecting backup paths (or giving higher priority to certain backup paths) that can lead to higher Mean Time to Repair (MTTR) for the network. Also, additional time would be needed to for retuning again when the frequency is shifted back to the original frequency when the home path is restored (e.g., fault is cleared, etc.). Therefore, the embodiments of the present disclosure are configured to overcome this deficiency of conventional systems by considering restoration criteria with minimum retuning time. Reducing this retuning time to as low as possible essentially means offering better service to customers.

Figure 1:
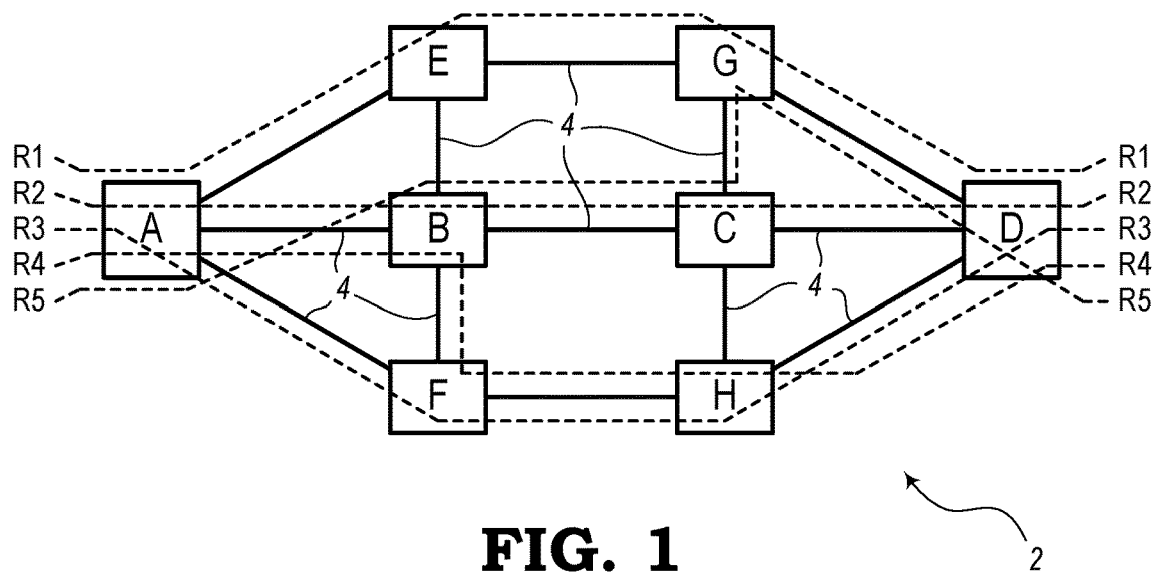
FIG. 1 is block diagram illustrating nodes in a network where a home path and multiple restoration paths are available, according to various embodiments.

FIG. 1 is a block diagram illustrating an embodiment of a network 2 having a plurality of nodes. In the illustrated example, the network 2 includes Node A, Node B, Node C, Node D, Node E, Node F, Node G, and Node H. The nodes may be connected to each other via a number of links 4 arranged in a mesh-type topology. In this way, the nodes may communicate with each other via a plurality of different routes or paths.

In some cases, two adjacent nodes (e.g., Node A and Node B) can communicate with each directly since there is link 4 between them. However, if this particular link 4 is unavailable (e.g., due to a fault on the link), then these nodes may still communicate using an alternative route (e.g., via Node E or Node F).

In other cases, two non-adjacent nodes (e.g., Node A and Node D) may communicate with each other indirectly via a plurality of different routes. For example, the network 2 may be configured where Node A can communicate data packets to Node D via a "home path," which may also be referred to as a primary path or main path. In this example, the home path includes a route from Node A to Node E to Node G to Node D (e.g., which may be written using the notation "A-E-G-D"). If or when a fault is detected along this home path, a L0CP controller may be configured to switch to one of multiple restoration paths that may be available to restore a communication route between Node A and Node D.

For example, as shown in FIG. 1, in addition to a home path (e.g., primary path, preferred path, etc.), there may be many possible alternative paths (e.g., restoration paths, protection paths, etc.), such as:

Route 1 (R1): A-E-G-D (i.e., the home path)
Route 2 (R2): A-B-C-D
Route 3 (R3): A-F-H-D
Route 4 (R4): A-B-F-H-D
Route 4 (R5): A-B-C-G-D Thus, in this example, there may be four restoration paths (e.g., R2, R3, R4, R5). Also, according to this example, the above list of different restorations paths may have an initial order that determines which restoration path is attempted first if there is a fault on the home path. Then, if that first restoration path is also unavailable, the system may attempt the next restoration on the list. The initial order in this example may include attempting R2 first, then R3, then R4, and then R5 (i.e., a R2, R3, R4, R5 order).

Suppose, for example, that a network service is running on path R1 with center frequency F1. Also, suppose that the link between Node B and Node C (i.e., the "B-C link") does not have F1 available. Therefore, routes R2 and R5, which use the B-C link, would be considered to have "frequency contention" (i.e., the available wavelengths on the respective paths do not include the center frequency F1 operating on the home path). For restoration in this case, the network 2 would need to perform a retuning process for tuning (or retuning) a modem from F1 to some other available frequency. However, routes R3 and R4 shown in FIG. 1 do not include this B-C link and hence do not have frequency contention.

Two possible solutions may include explicit path calculation or implicit path calculation. With explicit path configuration technique, R2, R3, R4 and R5 are explicitly configured alternate restoration paths, configured in that order, whereby all paths have been validated for use as backup paths. As per conventional restoration mechanisms, controllers for Sub-Network Connection (SNC) would pick R2 as alternative path since it is the first configured path, which causes SNC to go through a retuning process to some other available frequency. As mentioned above, this may lead to an overall delay in traffic restoration. On the other hand, alternate user configured paths R3 and R4 (i.e., without contention) may be available for providing no retuning and faster restoration.

With the implicit path configuration technique, the controller of the L0CP may calculate R2 (A-B-C-D) as the first alternative route using conventional Path Computation Engine (PCE) constraints. However, since the R2 path has frequency contention for restoration, and while another path (e.g., route R3 (A-F-H-D)) may be available with the same center frequency, the present disclosure may be configured to choose to use route R3 instead. As per conventional restoration mechanism, however, the controllers for SNC would pick R2 as the preferred alternative path, which also causes SNC to go through the retuning process to some other available frequency. Again, this may lead to overall delay in traffic restoration, whereas other alternative paths may be available for providing no retuning and faster restoration.

Figure 2:
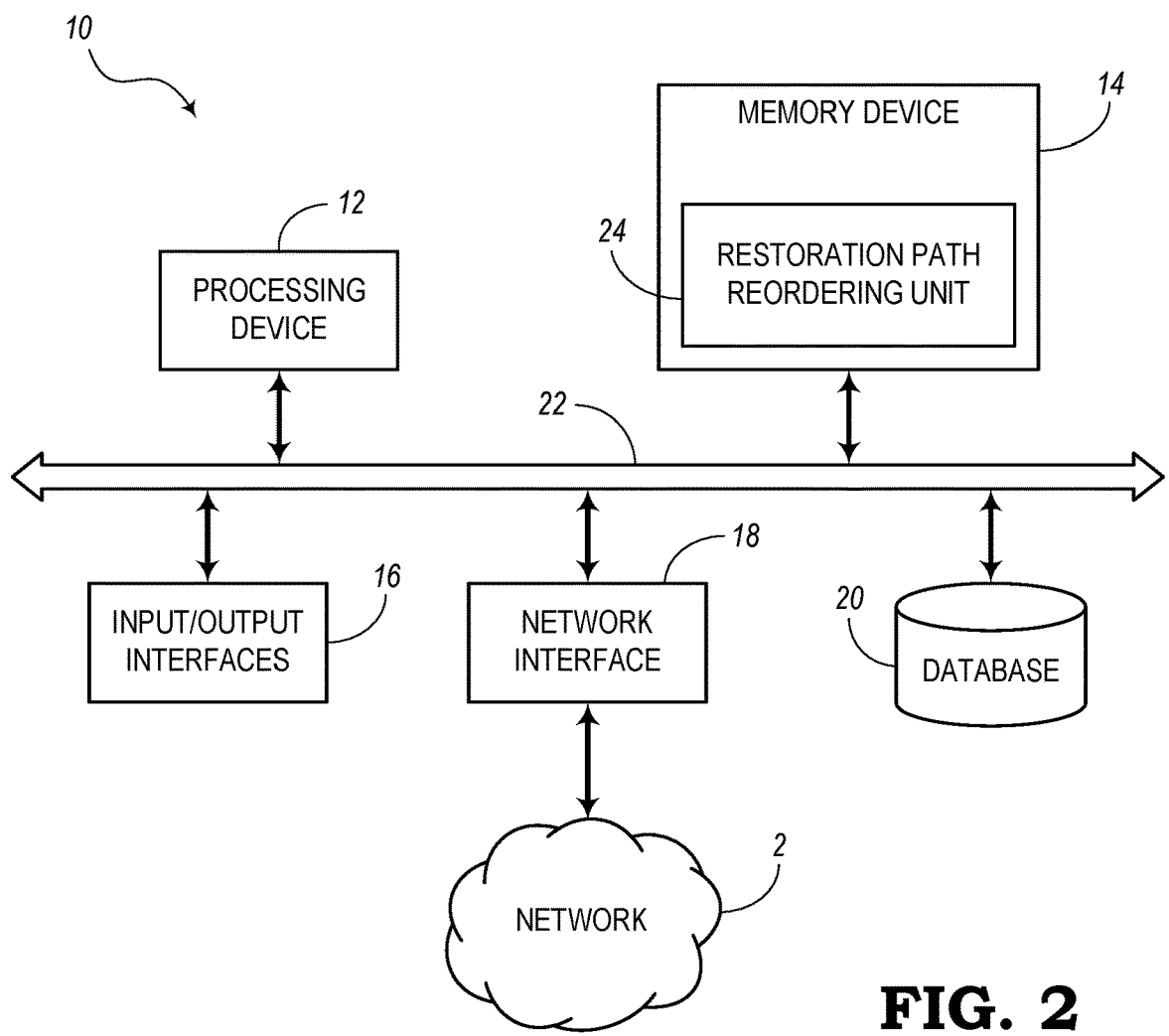
FIG. 2 is a block diagram illustrating a computer system for reordering lists of restoration paths based on retuning penalties, according to various embodiments of the present disclosure.

FIG. 2 is a block diagram illustrating an embodiment of a computer system 10 for reordering lists of restoration paths based at least on retuning penalties. The computer system 10 may operate in a control plane (e.g., L0CP) in a network for providing routing control instructions to nodes for routing traffic through the network. For example, the computer system 10 may be part of a Network Management System (NMS) or the like.

In the illustrated embodiment, the computer system 10 may be a digital computing device that generally includes a processing device 12, a memory device 14, Input/Output (I/O) interfaces 16, a network interface 18, and a database 20. It should be appreciated that FIG. 2 depicts the computer system 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the computer system 10 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

The memory device 14 may include a data store, database (e.g., database 20), or the like, for storing data. In one example, the data store may be located internal to the computer system 10 and may include, for example, an internal hard drive connected to the local interface 22 in the computer system 10. Additionally, in another embodiment, the data store may be located external to the computer system 10 and may include, for example, an external hard drive connected to the Input/Output (I/O) interfaces 16 (e.g., SCSI or USB connection). In a further embodiment, the data store may be connected to the computer system 10 through a network and may include, for example, a network attached file server.

Software stored in the memory device 14 may include one or more programs, each of which may include an ordered listing of executable instructions for implementing logical functions. The software in the memory device 14 may also include a suitable Operating System (O/S) and one or more computer programs. The 0/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., the processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 16 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The computer system 10 may further include a restoration path reordering unit 24. The restoration path reordering unit 24 may be configured as software and/or firmware and stored in the memory device 14 and/or database 20. Alternatively, the restoration path reordering unit 24 may be configured as hardware and incorporated in the processing device 12. In still other embodiments, the restoration path reordering unit 24 may be configured as any suitable combination of hardware, software, and/or firmware in the computer system 10 for performing certain operations as described in the present disclosure. The restoration path reordering unit 24 may be stored on non-transitory computer-readable media and include computer-readable instructions that may be executed by the processing device 12.

Generally, the restoration path reordering unit 24 may be configured to enable the processing device 12 to obtain a list a restoration paths (e.g., in a Designated Transit List or DTL) that may be used as backup paths for a primary (or home) path. For example, this list or DTL may include a particular order based on the ongoing transmission costs (e.g., long-term or steady-state costs) that may be incurred of each specific restoration path. Thus, the initial list may simply look at the ongoing transmission costs regardless of initial restoration costs, which, for example, may be a factor of an amount of modem tuning needed when the available wavelengths (or frequencies) of the restoration path are different from the operating wavelength (or frequency) of the primary (or home) path. However, in contrast to conventional systems, the restoration path reordering unit 24 is configured to determine a new list that reorders the restoration paths according to not only the ongoing transmission costs, but also the initial restoration costs. For example, the initial restoration costs may be a factor of the difference in frequency (or wavelength) between the operating path (home path) and each of the different restoration paths.

The network interface 18 may be used to enable the computer system 10 to communicate over a network, such as the network 2, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network 2. In some embodiments, the network interface 18 may be configured to provide instructions to a modem associated with a Network Element (NE) to tune (or retune) the modem as needed when a restoration path is used as backup when the primary (home) path is down.

According to various embodiments, the restoration path reordering unit 24 may be configured to (or may enable the processing device 12 to) obtain a list of restoration paths used for restoring transmission in a network when a home path between an originating node and a termination node is unavailable. In this example, the restoration paths may be listed in a specific order based on ongoing transmission costs associated with transmitting signals along each of the restoration paths. The restoration path reordering unit 24 may also be configured to (or may enable the processing device 12 to) reordering the restoration paths in the list based on the ongoing transmission costs as well as initial restoration costs related to a procedure for switching to each of the restoration paths.

The restoration costs may be related to a home frequency associated with the home path and a restoration frequency associated with each of the restoration paths. The restoration costs may be based on a retuning procedure for tuning (or retuning) a modem from the home frequency to each restoration frequency associated the respective restoration paths when there is frequency contention between the respective restoration frequency and the home frequency. The restoration costs may be based on a time needed to perform the modem-retuning procedure. The home frequency and the restoration frequencies may be center frequencies. In some embodiments, the computer system 10 may utilize the memory device 14 and/or database 20 to store vectors (or sets of two data values) where the two types of values include frequencies and restoration costs.

The restoration path reordering unit 24 may be further configured to (or may enable the processing device 12 to) add a first parameter (e.g., MIN_RETUNE) to a L0CP Optical Switching and Routing Protocol (OSRP) for allowing a user (e.g., network manager) to enable or disable the characteristic for reordering the restoration paths based on restoration costs. The systems and methods may also be configured to add a second parameter (e.g., RETUNE_PENALTY) to the L0CP OSRP for allowing a user to enter an acceptable limit for the ongoing transmission costs for the associated restoration paths that have no restoration costs. The second parameter may also allow the user to add constraints including one or more of home path diversity, shared path diversity, and maximum ongoing transmission costs.

In some embodiments, the restoration path reordering unit 24 may be configured to (or may enable the processing device 12 to) use explicit path configuration procedures and/or implicit path configuration procedures. The computer system 10 may be incorporated, according to some embodiments, in a centralized Network Management System (NMS) Path Computation Engine (PCE) system and/or a localized Network Element (NE) PCE system. The centralized NMS PCE, for example, may be configured for offline operation and/or online operation.

The restoration path reordering unit 24 may include a technique for analyzing the frequency (or available frequencies) of each of the restoration paths in the ordered list. The restoration path reordering unit 24 may also include a technique for analyzing any retuning penalties for the various restoration paths (for those paths where retuning of the modem is needed). This second technique may include using the available frequencies of the respective restoration paths and determining a difference in frequency from these available frequencies and the operating frequency of the home path. For example, the frequency difference may be indicative of a retuning penalty/cost (e.g., retuning time) for that restoration path.

Figure 3:
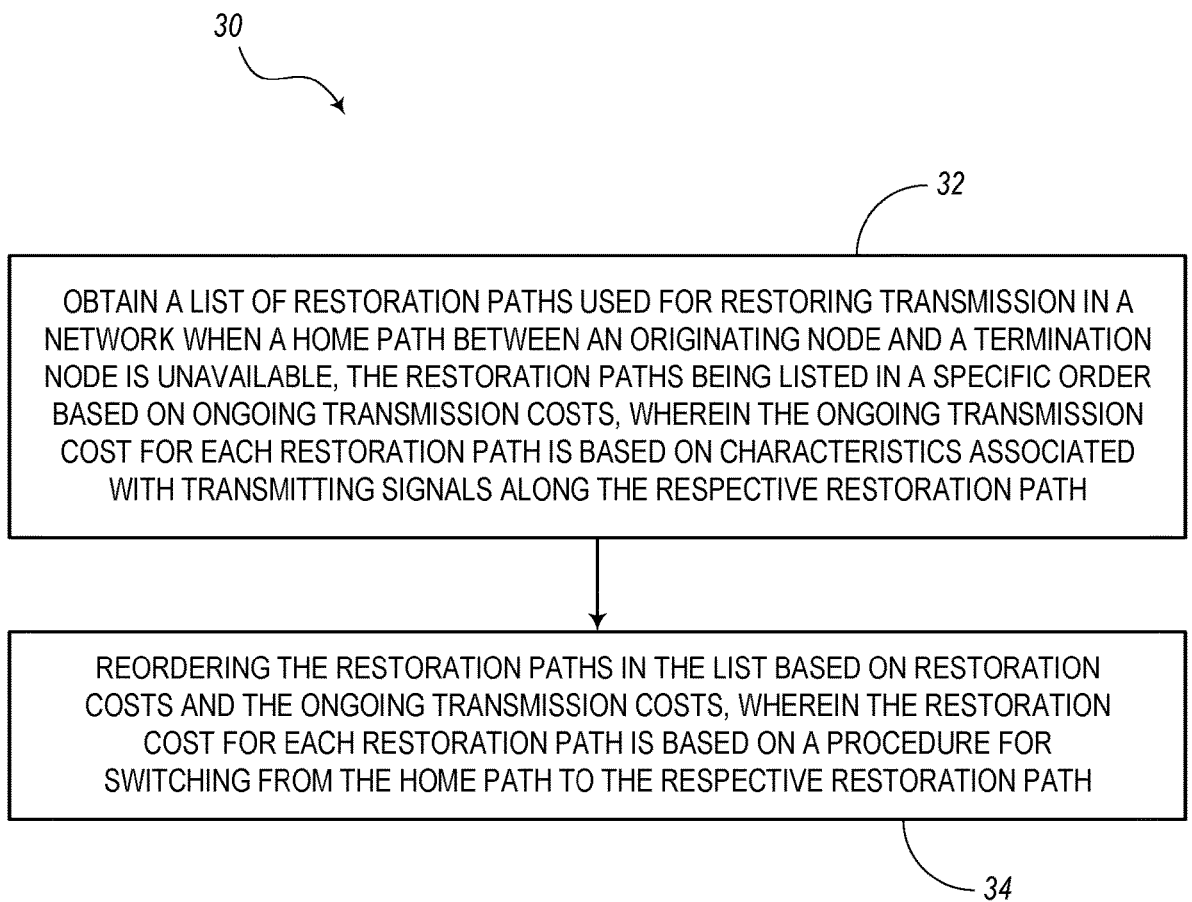
FIG. 3 is a flow diagram illustrating a process for reordering lists of restoration paths based at least on retuning penalties, according to various embodiments of the present disclosure.

FIG. 3 is a flow diagram showing an embodiment of a process 30 for reordering lists of restoration paths based at least on retuning penalties. As shown, the process 30 may include a first step of obtaining a list of restoration paths used for restoring transmission in a network when a home path between an originating node and a termination node is unavailable, as indicated in block 32. For example, the restoration paths may be listed in a specific order based on ongoing transmission costs associated with transmitting signals along each of the restoration paths. The process 30 may further include another step of reordering the restoration paths in the list based on the ongoing transmission costs and restoration costs related to a procedure for switching to each of the restoration paths, as indicated in block 34.

According to additional embodiments, the restoration costs described in the process 30 may be related to a home frequency characteristic associated with the home path and a restoration frequency characteristic associated with each of the restoration paths. The restoration costs may be based on a retuning procedure for retuning from the home frequency to each restoration frequency associated the restoration paths when there is frequency contention between the respective restoration frequency and the home frequency. Also, the restoration costs may be based on a time needed to perform the retuning procedure. For example, the home frequency characteristic and the restoration frequency characteristics may be center frequencies at the center of each optical channel. The process 30 may also include the step of storing vectors (e.g., data including frequencies and restoration costs).

In some embodiments, the process 30 may also include the step of adding a first parameter (e.g., MIN_RETUNE) to L0CP OSRP for allowing a user to enable or disable the characteristic for reordering the restoration paths based on restoration costs. The process 30 may also include adding a second parameter (e.g., RETUNE_PENALTY) to the L0CP OSRP for allowing a user to enter an acceptable limit for the ongoing transmission costs for the associated restoration paths that have no restoration costs. The second parameters may also allow the user to add constraints including one or more of home path diversity, shared path diversity, and maximum ongoing transmission costs.

Furthermore, the process 30 may also include the step of using explicit path configuration procedures and/or implicit path configuration procedures, which may be implemented within a centralized NMS PCE system and/or a localized NE PCE system. The centralized NMS PCE, for example, may be configured for offline and/or online operation.

The systems and methods of the present disclosure (e.g., computer system 10, process 30, etc.) may be configured to provide solutions either at a Centralized Level PCE (Offline and Online) or Network Element level (Local PCE). The methods may be implemented on an individual level or can be combined at both the Centralized and NE levels.

According to various embodiments, the present disclosure describes a process that adds two new parameters on L0CP services. The first parameter may be referred to as "MIN_RETUNE" or another suitable name. This parameter can provide a user option to turn on or turn off (enable/disable) a service to prioritize some frequency characteristic (e.g., center frequency) during protection path computation and validation. In other embodiments, a similar parameter may be used to allow a user to select among several retuning choices, such as 1) do not allow retuning, 2) allow a small amount of retuning, 3) allow an average amount of retuning, 4) allow a large amount of retuning, 5) allow all retuning, and/or other selection levels.

In some embodiments, the MIN_RETUNE parameter may enable/disable little or no retuning or up to a certain minimal amount of retuning. In some respects, this parameter may be related to prioritizing the working frequency of the home path. The MIN_RETUNE parameter may be incorporated in the system to allow the user to select whether or not a retune penalty will be taken into account or an option to consider retuning costs or not consider retuning costs. This may be a Boolean parameter or setting for switching on or off and may be recorded as a one-bit flag.

Another parameter to be added to an OSRP is the RETUNE_PENALTY parameter. This may be a multiple-bit parameter for storing a cost or penalty associated with particular retuning procedures needed to switch from a working frequency to an available frequency on the restoration path. This allows the user to specify an additional maximum cost that may be allowed for certain routes. In some cases, this parameter may be associated with extra ongoing transmission costs for those routes that are able to utilize the same frequency as the operating frequency and thereby prevent any retune processes. Thus, this parameter and/or other similar parameters may be implemented in the system as a retune penalty for considering those routes where retuning is necessary and/or a retune prevention penalty for considering those routes where retuning is avoided.

The RETUNE_PENALTY may be an extra cost to retune to various levels, may be related to a difference in frequency, and/or may be related to the time it would take to retune, which could be factor of the frequency difference. A RETUNE_AVOIDANCE_PENALTY may be related to an extra penalty or cost that may be caused by extra latency (ongoing or long term) that it may take for signals to traverse a longer path (even when no initial retuning process is needed). Therefore, the user may be able to determine a balance between long-term (ongoing) costs of avoiding initial retuning on some longer traffic routes versus the initial downtime cost of retuning on the shorter traffic routes. The RETUNE_PENALTY may also allow the user to select a maximum allowable initial retuning cost/penalty/time and/or to select a maximum allowable cost/penalty/time of using a route that avoids the initial retuning and/or some combinations of these. This parameter may also be implemented as retune avoidance penalties/thresholds and/or retune minimization penalties/thresholds.

In a centralized Network Management System (NMS) environment, a Path Computation Engine (PCE) may be used in an offline manner. For example, the NMS may use a planning tool (e.g., restoration path reordering unit 24 and/or other path analysis modules) for using historic information to plan the reordering of restoration paths within a list that include the possible backups and the order in which they may be utilized.

The offline planning tool may be configured to plan the frequency assignments in such a way that different services will occupy different spectrum, until no other frequency left to assign. This may be performed to create an initially ordered list. Also, this process may be done such that there may be minimum retunes in the case where restoration is to be implemented during a network fault, particularly in heavily loaded mesh networks (e.g., network 2 shown in FIG. 1).

If MIN_RETUNE is set to "yes" or "enabled" on a service, the planning tool may be configured to analyze the complete network with respect to other services planned on the network. Then, the planning tool may take the additional RETUNE_PENALTY into consideration and find the restoration path as per other user specified constraints (e.g., home path diversity, shared path diversity, maximum cost constraints, etc.) in the restoration paths where the same frequency as the operation center frequency of the home path is available.

The offline PCE tool may also be configured to push (reorder) these restoration paths to the top of the list in first include those restoration paths where the home center frequency is available and a constraint (e.g., threshold, condition, etc.) for the RETUNE_PENALTY is satisfied. For the restoration paths where the home center frequency is not available, the offline PCE tool may be configured to insert these restoration paths in the list after the paths that satisfy a "no-retune" criteria, provided that all other user specified constrains are satisfied.

The centralized NMS level may also include PCE operations in an "online" manner, during operation of the network 2. The NMS (e.g., computer system 10) may include the capability to reorder existing restoration paths or push new restoration paths into service based on the network status. The NMS may consider multiple fault scenarios and, as a result, may reorder the existing restoration paths or push the new restoration paths in the set list for a service where same frequency is available.

The NMS may be configured to analyze the complete network with respect to other services (which may or may not originate on the same originating node—Node A) running in the network. Also, the NMS may perform the following set of actions when MIN_RETUNE is set to "yes" or "enabled" on a SNC: a) for creating new services, it can work like the offline planning tool, b) for existing services, it can scan through the network in a periodic manner and dynamically reorder the restoration paths (protection paths) according to a minimum retune criteria that satisfies one of the RETUNE_PENALTY criteria along with other user-defined constraints inside the corresponding list of the set of restoration paths for the L0CP services. In the case that the planning tool finds no valid restoration path that satisfies a "no-retune" criteria for a service, it may dynamically add one or more restoration paths in the list for corresponding services based on the constraints using the PCE of the NMS.

Also, the computer system 10 may be implemented on a Network Element (NE) level for a single node or NE. In this arrangement, other nodes in a network may also include their own similar planning tool (e.g., restoration path reordering unit) for a local control level approach (e.g., local PCE). In these embodiments, the solution may be configured to dynamically reorder the explicitly configured restoration paths (e.g., protect routes) based on the availability of an operation center frequency (or other frequency or wavelength characteristic) to avoid un-necessary retunes.

Fixed and/or variable penalties can be introduced in the calculations for retuning across different paths, when necessary. The penalties may be different for different frequencies. Also, the weights for determining penalties can be configured by the planning tool itself or can come from user entries. In some embodiments, the home path may be given preference, irrespective of the availability of other restoration paths having the same applicable frequency characteristic as the operating or working frequency characteristic of the path in operation.

If a first restoration (protect) path does not have the same frequency available, then the planning tool may calculate a first restoration path cost and a retuning penalty and compare these values with a second restoration path cost. If "first restoration path cost+retuning penalty" is greater than "second restoration path cost" (assuming the same frequency is available on the second path, and thus assuming no retuning penalty for this path), then the planning tool may be configured to push the second restoration path before the first restoration path in the list (e.g., Designated Transit List or DTL).

The planning tool may allow the user to configure a Retune Penalty for a specific service (e.g., from Node A to Node D), which can be considered for implicit protect path computation. Giving preference to those implicit alternative routes where the current center frequency is available, given that the cost lies within permissible limits according to Retune Penalty with respect to the shortest available path.

In case of heavily loaded networks (e.g., mesh networks), there may certain situations where two services might compete for the same spectrum on a common link present on respective restoration paths. In this case, the spectrum may be allocated on a first come, first serve basis. Also, the second service may be configured to attempt to restore communication on another alternate route from its own restoration path list where the same operating frequency is available.

Referring again to FIG. 1, an example may be considered where a service is running on frequency F1 on path R1, with R2, R3, R4, and R5 being explicitly ordered as alternative paths to be attempted in that order. Also, suppose the user has configured the RETUNE_PENALTY parameter as "Rp." In this situation, a centralized (NMS) planning tool may be configured to take the following set of actions: a) with RETUNE_PENALTY configured as Rp, after adding the RETUNE_PENALTY to the regular cost, the order may be changed, for example, if cost (R3)<(cost (R2)+Rp) and if cost (R2)+Rp<cost (R4). The comparison of cost (R4) and cost (R5)+Rp would not be required since R4 is already ahead of R5 in the original list and since R4 does not include any retuning. As a result of these actions, the planning tool may be configured to re-arrange the restoration paths in a new order of R3, R2, R4, R5 for the NE. The planning tool may push (store) a vector including frequency and retune cost, which may be written as "Ri {(F1, C1), (F2, C2), . . . , (Fn, Cn)}" to the respective NE for each of the restoration paths.

In another example, a Network Element (NE) may be configured to perform the following dynamic action over the restoration path list per service in a periodic manner where the NE may receive the order R3, R2, R4, and R5 from the planning tool. Then, suppose that, due to change in network dynamics, the center frequency (Fc) is longer available on R3, and instead of Fc, R3 has Fr3 as the next best available frequency, Fr2 is on R2, and Fr5 on R5. Also, suppose that R4 still has Fc available. Furthermore, suppose that the cost (R4)<cost (R3)+cost (R3 (Fr3)) and that other comparisons are not required since R3 is ahead of other restoration paths in the list as per the original order received (e.g., from a centralized planning tool or from a user). Then, NE may reorder the restoration paths in the order R4, R3, R2 and R5.

In the situation where link E-G fails, the planning tool may restore to path R4 (since the current Fc is available and R4 satisfies a retune penalty constraint as well). That is, R4 (A-B-F-H-D), not R2 (A-B-C-D), is used since the same center frequency is not available on link B-C in this case, which will decrease the MTTR for the service. After mesh restoration, the network 2 may look different, as shown in FIGS. 4A-4C.

Figure 4A:
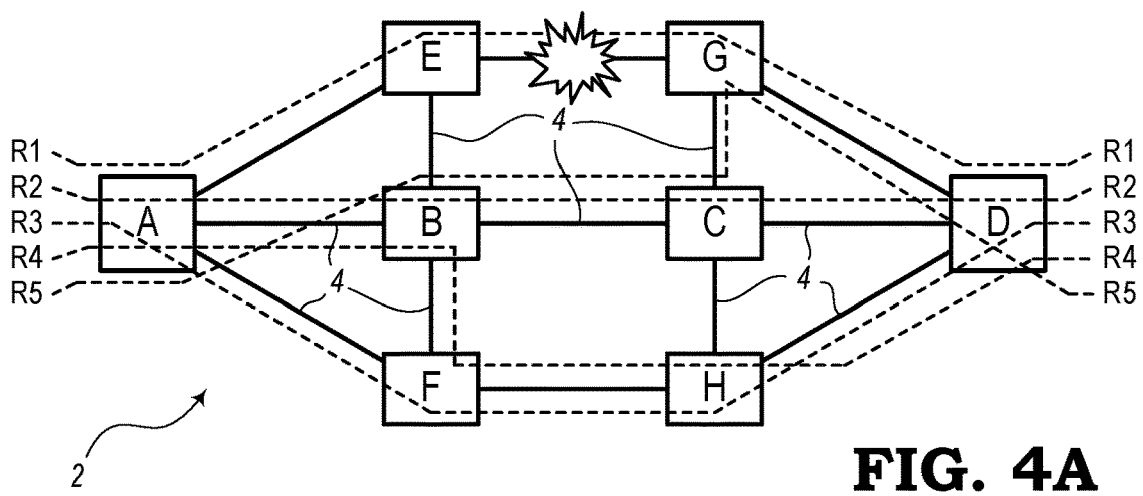
FIGS. 4A-4C are block diagrams illustrating the nodes of FIG. 3 in various states for demonstrating restoration strategies, according to various embodiments.
Figure 4B:
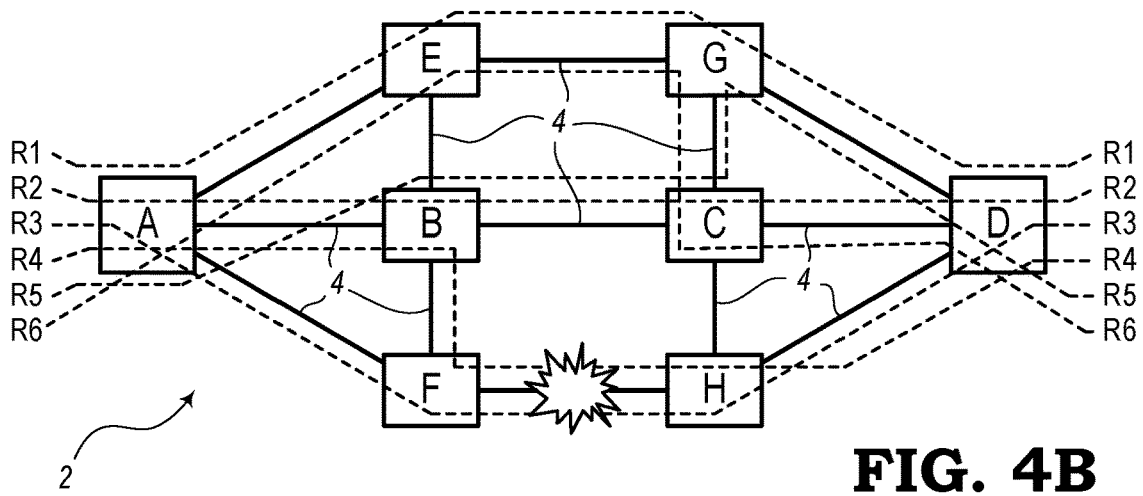
Figure 4C:
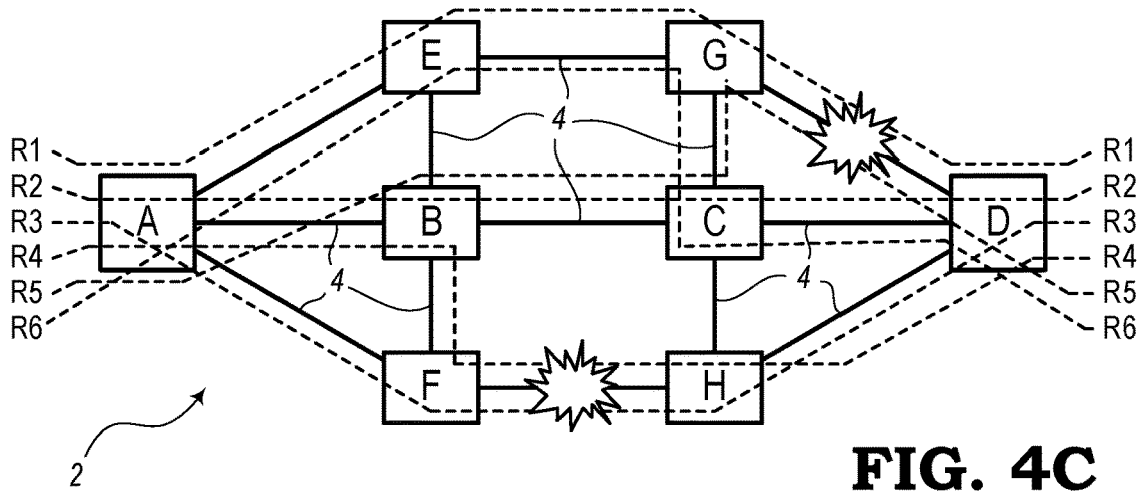

FIGS. 4A-4C show diagrams of the network 2 where the nodes and links 4 shown in FIG. 1 include various states for demonstrating different aspects of the restoration strategies described in the present disclosure. FIG. 4A shows a state where the link E-G is faulty. In case of implicit protect route computation, suppose the operating Fc is available on R3 and it satisfies the RETUNE_PENALTY criteria with respect to the shortest path in the network. In this case, the L0CP may be configured to calculate the alternative route R3 (A-F-H-D) as a higher priority route instead of R2 (A-B-C-D). As such, if there is a fiber failure on link E-G, the computer system 10 may be configured to switch to R3 to avoid a retuning process.

A centralized (NMS) PCE may be configured to operate in an online manner and may include following the NE level dynamic approach for reordering existing explicit protect path lists to put those protect paths on top where the current Fc is available. The centralized PCE operating offline may include a planning tool that can compute new restoration paths if there are no valid protection routes in order to ensure same Fc availability.

For example, considering a situation as shown in FIG. 4B where the planning tool detects that the link F-H is down. Also, suppose that the planning tool configures the order R3, R2, R4, and R5 in the list and that R3 and R4 having the same Fc available. When the link F-H goes down, the routes R3 and R4 will be invalid and may be eliminated from consideration. However, in this case where there are no more valid restoration paths having the same Fc, the planning tool (e.g., computer system 10, NMS, PCE, etc.) may be configured to recompute new restoration paths, such as new path R6 (A-E-G-C-D) which offers the same Fc. The R6 route may be preferred as a backup given that the cost (R6) cost (R2)+RETUNE_PENALTY and that the cost (R6) cost (R5)+RETUNE_PENALTY. As such, the NMS may move this path up the list to obtain an updated set list of R6, R2, and R5 for this NE.

As shown in FIG. 4C, considering another state where link G-D is observed as having a fault. In this case, there would be two remaining valid alternative routes (i.e., R2 and R6). The NE would select R6 in this case instead of R2 as the preferred restoration since the current Fc is available on R6. This may be considered to be the best effort algorithm to avoid retune processes while the service switches to alternate paths.

FIGS. 5, 6, and 7A-7C are flow diagrams illustrating various operating procedures for implementing the systems of the present disclosure. The procedures may be configured to add two new parameters to Transaction Language 1 (TL1) or other suitable management protocols for managing the nodes of the network. The parameters, as mentioned above, include MIN_RETUNE and RETUNE_PENALTY, which may be applicable for L0CP Sub-Network Connections (SNCs) and Sub-Network Connection Protection (SNCP) paths.

MIN_RETUNE may be a Boolean parameter and may have only two values (i.e., YES/NO). The user may be able to set the value of this parameter to YES in the case where he or she wants the algorithms related to the actions of considering retune costs to be performed. Otherwise, the user can set the value to NO. The parameter RETUNE_PENALTY may be an additional cost that the user might be willing to sacrifice in order to prevent retune.

In the case where service is running on a restoration path other than the main home path, the home path still remains as the highest priority irrespective of the MIN_RETUNE flag. Additionally, the planning tool may be configured to push a (Frequency, Cost) vector to OSRP that would contain a set of mappings of a center frequency and a retuning penalty cost. For example, the mappings may have a format of {(F1, C1), (F2, C2), . . . , (Fn, Cn)}. The vectors may be sorted in an increasing order based on Cost.

When the restoration path reordering unit 24 is configured as a centralized planning tool (e.g., on an NMS level) and is operating offline, the following analysis may be performed. If MIN_RETUNE is set to yes on a service, the planning tool may analyze the complete network with respect to other services planned in the network and may then perform an action of taking the additional RETUNE_PENALTY into consideration and calculate the restoration paths based on other user specified constraints (e.g., home path diversity, shared path diversity, maximum cost constraints, etc.) where the operating center frequency of the home path is available. The planning tool can reorder the list by putting the restoration paths where the same frequency is available on the top of the Designated Transit List (DTL). The DTL may include the restoration paths where the frequency is not available can be inserted after the entries that satisfy the user specified constrains.

The following set of operations may be performed by the planning tool during path computation to compute N protection (restoration) paths:

1. Set M to 0
   If MIN_RETUNE is set to YES, then:
   a. compute restoration paths where the Current Home Path Fc is available, provided that RETUNE_PENALTY is taken into consideration and that other user-specified constraints are satisfied, and
   b. Suppose M such paths are found; if M N, then skip step 2 and go to step 3.
2. Calculate N−M restoration paths where all user constraints are satisfied (no need to check for MIN_RETUNE flag).
3. For each restoration path in the list (e.g., DTL), compute per Frequency Retune Cost vector.
4. Publish the DTL with the restoration paths ordered as above to the NE.

Figure 5:
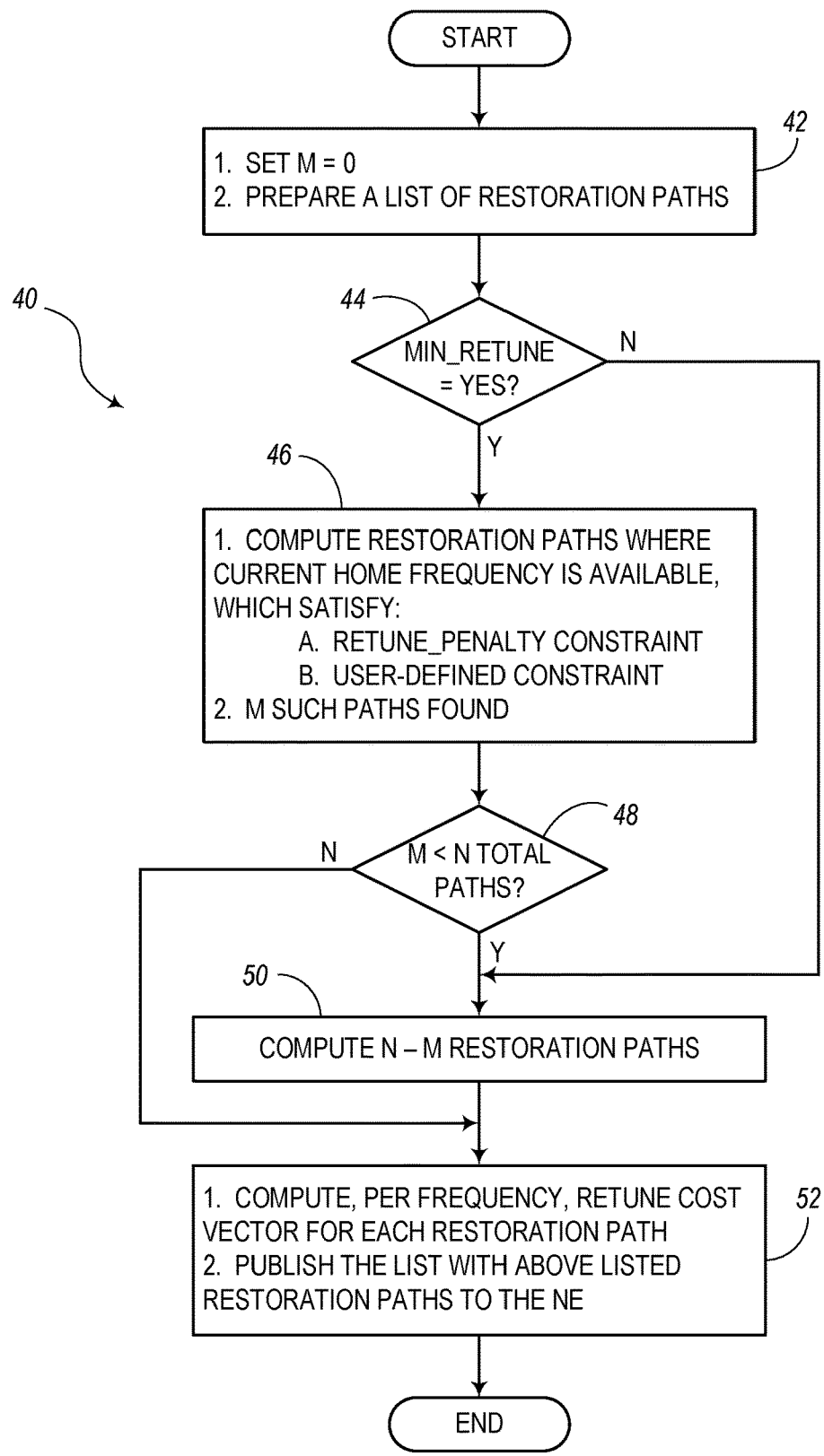
FIG. 5 is a flow diagram illustrating a process associated with a centralized level offline path computation tool, according to various embodiments.

FIG. 5 is a flow diagram showing an embodiment of a process 40 associated with a centralized level offline path computation tool. In this embodiment, the process 40 includes a step of setting M=0 and preparing a list of valid restoration paths, as indicated in block 42. The process 40 also include the step of determining if MIN_RETUNE is YES, as indicated in condition diamond 44. If not, the process 40 skips ahead to block 50. If MIN_RETUNE is YES, then the process 40 proceeds to block 46. Block 46 describes the step of computing the restoration paths where the home frequency is available, and which satisfy any RETUNE_PENALTY constraints and any user-defined constraints. From this computation, a number (M) of restoration paths are found.

The process 40 further includes determining if M<N. If not, the process 40 skips ahead to block 52. Otherwise, if M is less than N, then the process 40 includes computing a number N−M restoration paths, as indicated in block 50. Also, the process 40 includes the step of computing per frequency retune cost vector for each restoration path and publishing the list (e.g., DTL) with the above restoration paths reordered as described in the process 40, as indicated in block 52. This reordered list is provided to the NE.

In addition, a centralized online planning tool (e.g., computer system 10) may be configured to operate in a network to reorder restoration paths in a list. The centralized tool or PCE may be implemented on an NMS level or control plane for performing path computations and reordering processes that take retuning penalties into account.

The NMS in this case may analyze the complete network with respect to other services that may or may not have originated on the same NE or node running in the network. The NMS may perform the following set of actions when MIN_RETUNE is set to YES (e.g., on a SNC):

1. For creating new services or calculating new protect routes (restoration paths), the tool (e.g., restoration path reordering unit 24) may work like the Offline Planning Tool.
2. For existing services:
   the tool may scan through the network in a periodic manner and reorder the restoration paths according to a minimum retune criteria (e.g., satisfies the RETUNE_PENALTY criteria along with other user-defined constraints) inside the corresponding list (e.g., for L0CP services).
   In the case where the tool finds no valid restoration paths that satisfy the no-retune criteria for a service, the tool may dynamically add one or more new restoration paths in the list for the corresponding service as per constraints using a corresponding PCE.

The following set of periodic operations may be performed on existing services by the NMS reordering tool:
1. For each service running in the network, if MIN_RETUNE=YES:
2. Validate the existing Protect DTLs (e.g., restoration paths) and reorder the Validated Protect DTLs (other than the home path) inside a corresponding set list for the service according to the RETUNE_PENALTY criteria and other user-specified constraints for the PCE. Put such Protect DTLs (or restoration paths) on top of the list (e.g., Protect DTL).
3. If no validated Protect DTL satisfy the MIN_RETUNE criteria, then:
   Trigger a fresh set of Protect DTL computations on a best effort basis to calculate routes that satisfy MIN_RETUNE criteria and other user defined constraints,
   Compute the Frequency, Retune Cost Vector for freshly calculated Protect DTLs.
4. Push the updated DTLSET to the corresponding service on the NE.

Figure 6:
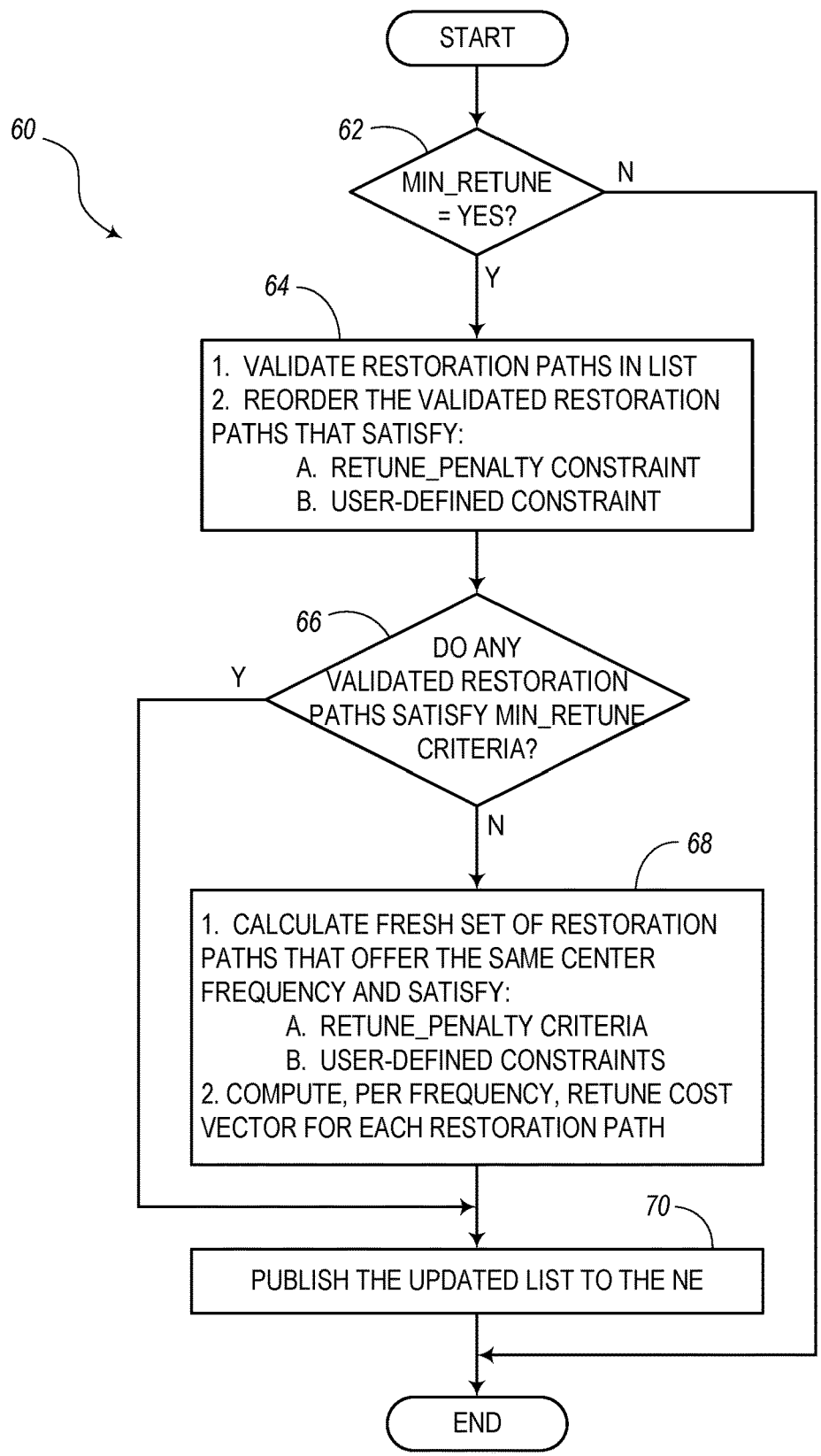
FIG. 6 is a flow diagram illustrating a process associated with a centralized level online path computation tool, according to various embodiments.

FIG. 6 is a flow diagram illustrating another embodiment of a process 60 associated with a centralized level online path computation tool, which may be executed by a Centralized Online Planning Tool. As shown in FIG. 6, the process 60 includes determining if MIN_RETUNE is YES, as indicated in the condition diamond 62. If not, the process 60 ends. Otherwise, if MIN_RETUNE is set, the process 60 goes to block 64, which includes the steps of 1) validating the Protect DTLs inside the set list, 2) reorder the validated Protect DTLs that satisfy MIN_RETUNE criteria according to a) RETUNE_PENALTY constraints and b) user-defined constraints.

The process 60 also includes the step of determining if no validated DTL satisfies the MIN_RETUNE criteria, as indicated in condition diamond 66. If there is no validated DTL, the process 60 goes to block 68. Otherwise, the process 60 skips ahead to block 70. Block 68 describes the steps of 1) calculating fresh set of Protect DTLs that offer the same center frequency and that satisfy: a) RETUNE_PENALTY criteria, and b) other user-defined constraints, and 2) computing per frequency retune cost vector for each Protect DTL. Block 70 includes the step of publishing the updated set list (e.g., DTL) to the NE.

According to another procedure, the computer system 10 or restoration path reordering unit 24 may be configured to perform a Network Element (NE) level (or local level) approach for real-time (online) path computation, such as by using a PCE, and reordering restoration paths according to the various steps described herein. In this case, the computer system 10 may be directly associated with or be part of one node (e.g., originating node, Node A shown in FIG. 1, etc.).

The NE in this embodiment is configured to allow the user to configure RETUNE_PENALY for each service that can be applied for calculation of implicit Protect DTLs, where Current Center Frequency is available. The NE may operate in a situation given that its cost lies within permissible limits according to the RETUNE_PENALTY with respect to a shortest available path.

The NE may perform the following periodic set of operations for each service during protection path computation/validation:
1. Check if Explicit Protect DTLs (restoration paths) are configured; if yes, go to step 2; else, go to step 4 (i.e., Implicit Protection DTL Calculation);
2. Validate all the Protect DTLs as per the order provided by the user; if none of the Explicitly configured Protect DTLs were validated, go to step 4; else, go to step 3;
3. If MIN_RETUE is set to YES, set INDEX=−1, go to step 3a; else, go to step 4;
   a. If First DTL is Home DTL, set INDEX=0;
   b. For each Valid Protect DTL (other than Home DTL), do the following:
   c. Check if current Center Frequency is available; if no, go to step 3d; else, go to step 3e;
   d. For corresponding Protect DTL, scroll through the (F, C) vector to check the first available frequency for the DTL and tag the total cost for DTL (i.e., Path Cost+ Corresponding Penalty for retuning to first available Frequency);
   e. For Corresponding Protect DTL:
      i. Search J from INDEX+1 until corresponding Protect DTL in the Protect DTL list for service such that DTL_Cost (J)≥Current DTL_COST;
      ii. If J is found, remove the Current Protect DTL from its position and Insert at Jth position and Set INDEX=J;
   f. If all Valid Protect DTLs verified for the Current Center Frequency are available, go to step 6;
4. Compute the Implicit Protection DTL for the service; if no such DTL found, go to step 6; else, go step 5;

5. If MIN_RETUNE is set to YES, Check if current Center Frequency is available on corresponding Implicitly Calculated Protection path; if yes, go to step 6; else, go to step 5a;
   a. Calculate the Implicit Protect DTL where current Center Frequency is available; if no such path is available, then go step 7; else, go to step 5b;
   b. Check if the Corresponding DTL's Cost ≤Cost (Implicit Protect DTL calculated in step 5)+RETUNE_PENALTY; if yes, go to step 6c;
   c. Remove Implicit Protect DTL computed in step 5 and Insert the Implicit Protect DTL calculated in step 5a in the Protect DTL list for the service;
6. Publish the Valid Protection DTL list for the corresponding service to the user.

The above operating principle confirms in the case of SNC switching path (which could be due to mesh restoration or manual operations) that the most weightage can be given to the alternative DTLs which offer the same Center Frequency, given that the Cost for the corresponding DTL is less than the Previously Configured DTLs+retuning penalty. Also, the following process may be understood as being related to the above decision-making processes for ordering the various paths/routes.

Figure 7A:
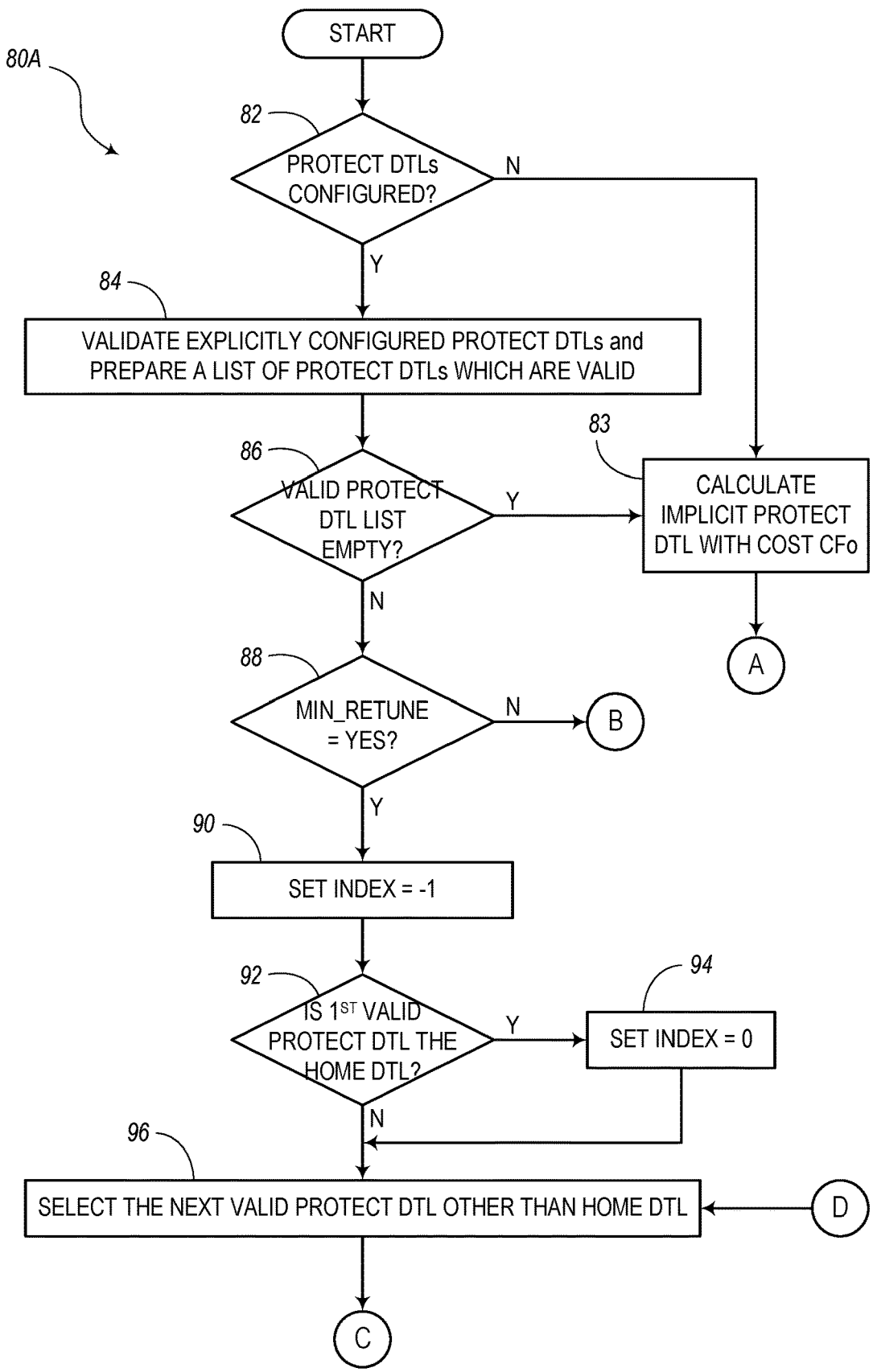
FIGS. 7A-7C, in combination, form a flow diagram illustrating a process associated with a localized level real-time path computation tool, according to various embodiments.
Figure 7B:
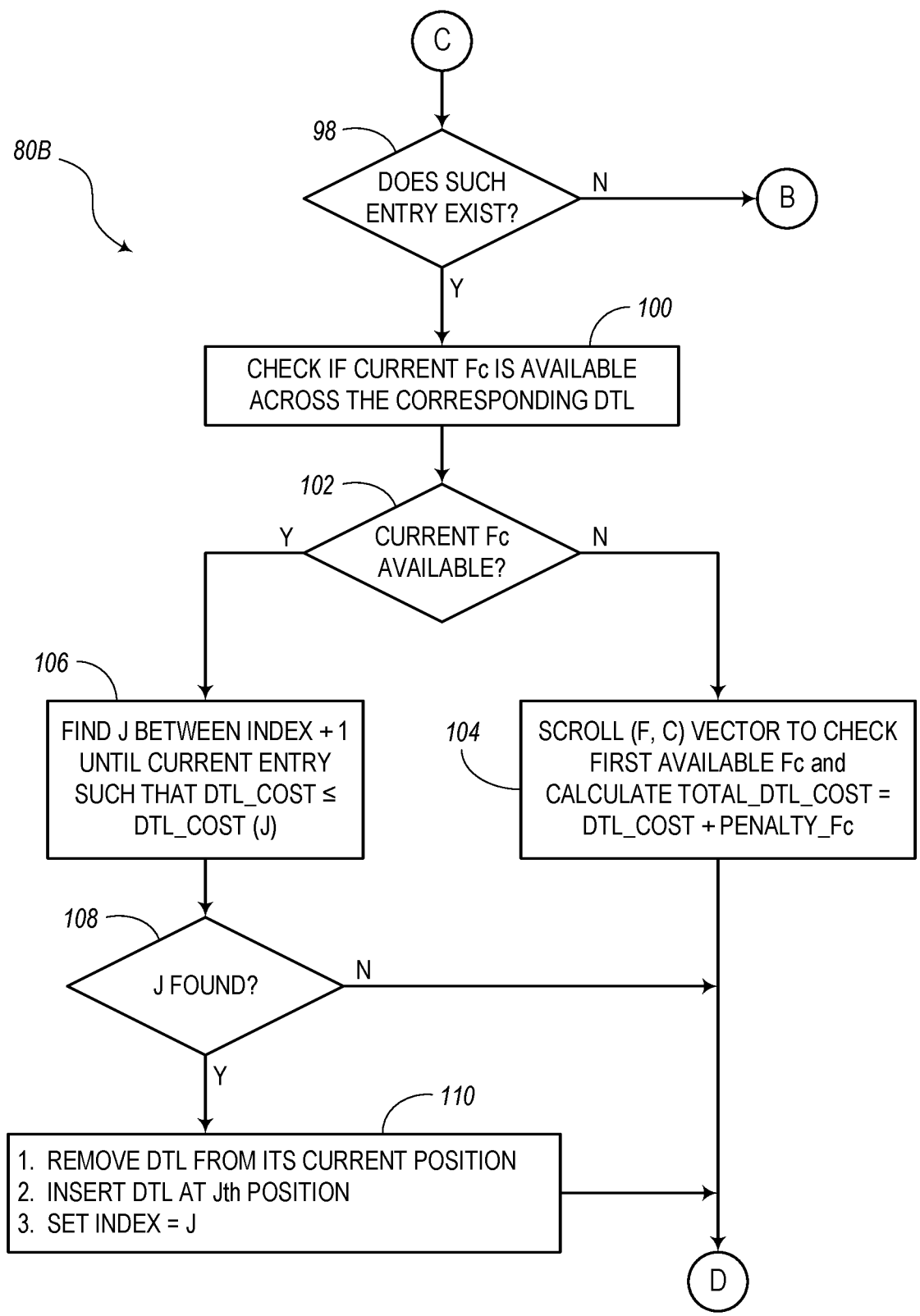
Figure 7C:
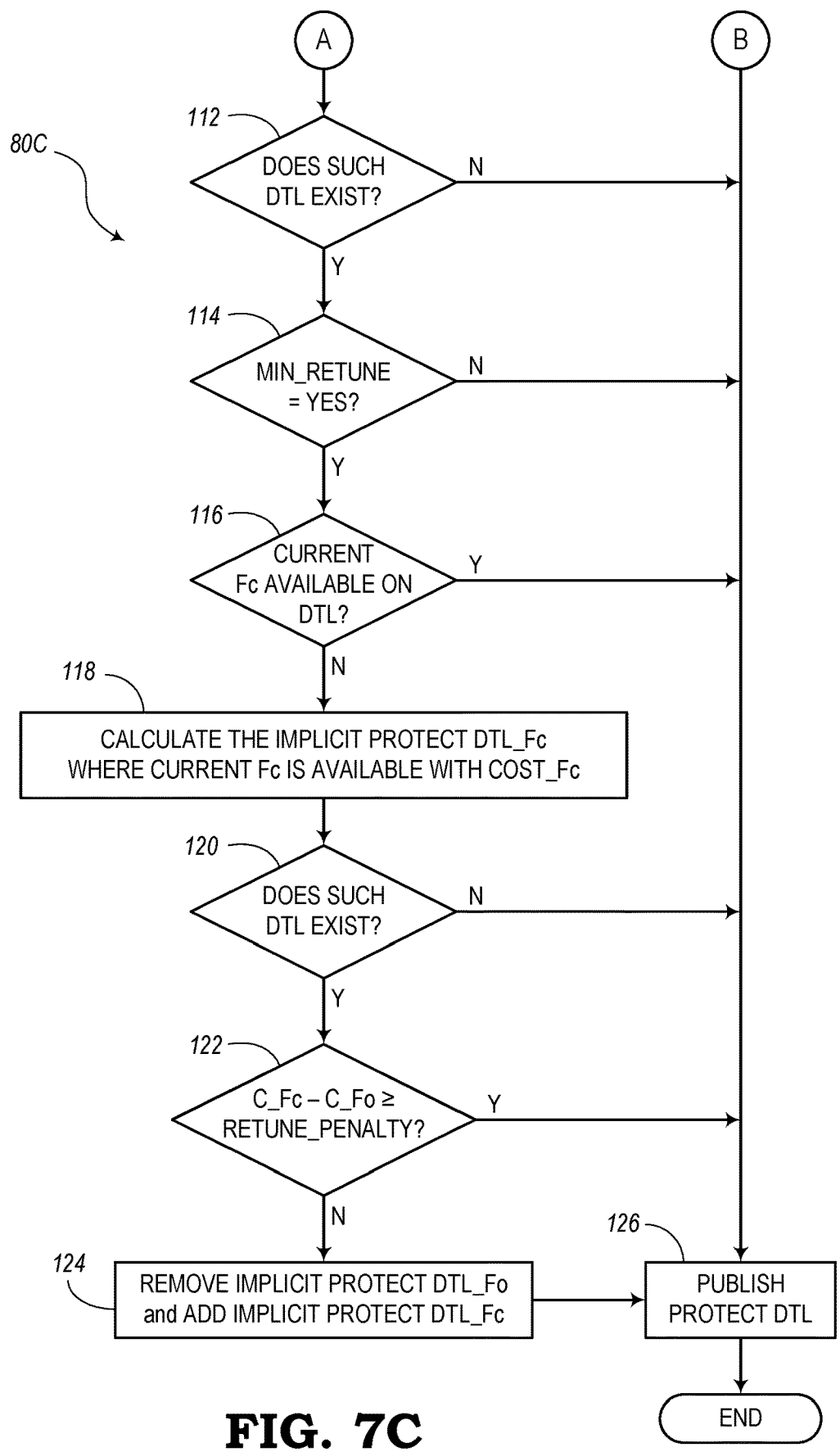

FIGS. 7A-7C, in combination, form a flow diagram that shows an embodiment of another process 80 (labelled 80A, 80B, and 80C in FIGS. 7A, 7B, and 7C, respectively). The process 80 is associated with a localized level real-time path computation tool. In this embodiment, the process 80 includes a step of determining if Protect DTLs are configured, as indicated in condition diamond 82. If not, the process 80 goes to block 83, which includes the step of calculating Implicit Protect DTL frequency with Cost. If it is determined in condition diamond 82 that Protect DTLs are configured, the process 80 goes to block 84, which includes the steps of validating Explicit Configured Protect DTLs and preparing a list of Protect DTLs which are valid.

The process 80 also includes determining if the Valid Protect DTL list is empty, as indicated in condition diamond 86. If so, the process 80 goes to block 83. Otherwise, the process 80 goes to condition diamond 88, which includes the step of determining if MIN_RETUNE is YES. If not, the process 80 jumps ahead to block 126. However, if MIN_RETUNE is determined to be YES, the process 80 proceeds to block 90, which includes the step of setting INDEX to −1.

Also, the process 80 includes determining, as indicated in condition diamond 92, if the first Valid Protect DTL is the home DTL. If so, then INDEX is set to 0, as indicated in block 94. Otherwise, if not the home DTL, the process 80 goes to block 96, which includes the step of selecting the next Valid Protect DTL other than the home DTL. Then, the process 80 proceeds to condition diamond 98.

Condition diamond 98 includes the step of determining if such an entry exists. If not, the process 80 jumps ahead to block 126. If the entry exists, the process 80 includes the step of checking if the current Fc (i.e., center frequency) is available across the corresponding DTL, as indicated in block 100. Next, the process 80 includes determining if the current Fc is available, as indicated in condition diamond 102. If the current Fc is not available, the process 80 goes to block 104, which includes the steps of scrolling (F, C) vectors to check the first available Fc and calculating a TOTAL_DTL_COST=DTL_COST+Penalty_Fc, and then loops back to block 96. If it is determined in condition diamond 102 that the current Fc is not available, the process 80 goes to block 106, which includes the step of finding a value J, between INDEX+1 until the current entry, such that DTL_Cost≤DTL_Cost (j). Then, the process 80 includes determining if J is found, as indicated in condition diamond 108. If not, then the process 80 loops back to block 96. If J is found, the process 80 includes the steps, as indicated in block 110, of 1) removing DTL from its current position, 2) inserting the DTL at the Jth position, and 3) setting INDEX=J. The process 80 then returns to block 96.

Furthermore, the process 80 includes calculating the implicit DTL (DTL_Fo) with cost (Cost (Fo)) in block 83, if such a DTL exists, as indicated in condition diamond 112. If no such DTL exists, the process 80 jumps ahead to block 126. If it does exist, the process 80 includes determining if MIN_RETUNE is YES. If not, the process 80 jumps ahead to block 126. If MIN_RETUNE is YES, the process 80 includes the step of determining if the current Fc is available on this DTL, as indicated in condition diamond 116. If so, the process 80 jumps ahead to block 126. Otherwise, the process 80 includes the step of calculating the Implicit Protect DTL_Fc where the current Fc is available with Cost (Fc), as indicated in block 118.

In response to the calculation with respect to block 118, the process 80 also includes determining if such a DTL exists, as indicated in condition diamond 120. If not, the process 80 jumps to block 126. Otherwise, the process 80 is configured to determine if Cost of Current Frequency (Cost (Fc)−Cost (Fo)≥RETUNE_PENALTY, as indicated in condition diamond 122. If so, the process 80 goes to block 126. Otherwise, the process 80 includes the steps of removing Initial Implicit Protect DTL (DTL_Fo) and adding the Implicit Protect DTL of the Center Frequency (Fc), as indicated in block 124. Block 126 includes the step of publishing the Protect DTL (reordered as described) or list. After publishing (e.g., to the NE), the process 80 comes to an end.

Therefore, according to various embodiments of the systems and methods described in the present disclosure, a user may be allowed to have the option to enable or disable parameter-based minimum retuning criteria. The systems and methods may include explicitly configuring one or more retune penalties on a service. The explicit protect path (restoration path) reordering process may be based on the currently operating Center Frequency of a home path and the respective center frequencies of the alternative restoration (or backup) paths. The embodiments of the present disclosure may allow a Path Computation Engine (PCE) to calculate implicit restoration paths based on current center frequency, which typically is not performed by conventional systems. Thus, the present disclosure provides a frequency-based restoration path selection process. According to the present embodiments, a centralized NMS or local NE may be configured to include the ability to consider minimum retuning characteristics.

Also, the embodiments of the present disclosure may be configured to include dynamic reordering of protect paths (or restoration paths) based on current center frequency of one or more available channels of each restoration path as well as the center frequency that the home path may currently be using for transmission. The retune penalty for SNCs may be configured with Explicit Protect DTLs. The present disclosure also allows for dynamic calculation of implicit protect path (by PCE) while giving priority to current center frequency.

New path calculation may consider Retune Penalty before choosing a no-retune path. The present systems and methods may also include flag-based configuration to enable minimum retune feature. Thus, implementation may include changing PCE behavior for preventing retuning. The various algorithms or techniques described herein can be implemented on Local PCE, Centralized Offline PCE, and/or Centralized Online PCE.

Certain benefits and advantages may be attained as a result of implementing the various embodiments described herein. For example, the present systems and method may be configured to reduce downtime during a restoration process when a fault is detected on a home path. This may help a service provider to meet certain customer requirements or demand, such as by reducing MTTR, since conventional systems do not consider retuning penalties which therefore results in unnecessary retuning that can add significant additional restoration delays. The present features can add value to a network or system for NMS operation and planning tool applications. In some cases, the present features may be added in a license-based agreement on an NE, MCP, Network Planning application, etc. Also, the present disclosure may allow for better spectrum planning during restoration processes.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store a computer program having instructions that, when executed, enable the processing device to
      obtain a list of restoration paths used for restoring transmission in a network when a home path between an originating node and a termination node is unavailable, the restoration paths being listed in a specific order based on ongoing transmission costs, wherein the ongoing transmission cost for each restoration path is based on characteristics associated with transmitting signals along the respective restoration path, and
      reorder the restoration paths in the list based on restoration costs and the ongoing transmission costs, wherein the restoration cost for each restoration path is based on a procedure for switching from the home path to the respective restoration path, wherein the restoration cost for each restoration path is related to a home frequency associated with the home path and a restoration frequency related to one or more available transmission channels on the respective restoration path.

2. The system of claim 1, wherein the restoration cost of each restoration path is based on a retuning procedure for retuning a modem from the home frequency to the respective restoration frequency when there is frequency contention between the home frequency and the respective restoration frequency.

3. The system of claim 2, wherein the restoration cost of each restoration path is based on a time needed to perform the retuning procedure.

4. The system of claim 1, wherein the home frequency and the restoration frequencies are center frequencies of optical transmission channels.

5. The system of claim 1, wherein the instructions further enable the processing device to store vectors including frequencies and restoration costs.

6. The system of claim 1, wherein the instructions further enable the processing device to add a parameter to a Layer 0 Control Plane (L0CP) for allowing a user to enable or disable a characteristic for reordering the restoration paths based on restoration costs.

7. The system of claim 1, wherein the instructions further enable the processing device to add a parameter to a Layer 0 Control Plane (L0CP) for allowing a user to enter an acceptable limit for the ongoing transmission cost for each of the restoration paths that have no restoration costs.

8. The system of claim 7, wherein the parameter allows the user to add constraints including one or more of home path diversity, shared path diversity, and maximum ongoing transmission costs.

9. The system of claim 1, wherein the instructions further enable the processing device to use one or more of explicit path configuration procedures and implicit path configuration procedures.

10. The system of claim 1, wherein the system is incorporated in one or more of a centralized Network Management System (NMS) Path Computation Engine (PCE) system and a localized Network Element (NE) PCE system.

11. The system of claim 10, wherein the centralized NMS PCE system is configured for one or more of offline operation and online operation.

12. A non-transitory computer-readable medium configured to store computer logic having instructions that, when executed, cause one or more processing devices to:
   obtain a list of restoration paths used for restoring transmission in a network when a home path between an originating node and a termination node is unavailable, the restoration paths being listed in a specific order based on ongoing transmission costs, wherein the ongoing transmission cost for each restoration path is based on characteristics associated with transmitting signals along the respective restoration path, and
   reorder the restoration paths in the list based on restoration costs and the ongoing transmission costs, wherein the restoration cost for each restoration path is based on a procedure for switching from the home path to the respective restoration path, wherein the restoration cost of each restoration path is related to a home frequency associated with the home path and a restoration frequency associated with the respective restoration path.

13. The non-transitory computer-readable medium of claim 12, wherein the restoration cost of each restoration path is based on a retuning procedure for retuning a modem from the home frequency to the respective restoration frequency when there is frequency contention between the respective restoration frequency and the home frequency, and wherein the restoration cost is based on a time needed to perform the retuning procedure.

14. The non-transitory computer-readable medium of claim 12, wherein the home frequency and the restoration frequencies are center frequencies.

15. The non-transitory computer-readable medium of claim 12, wherein the instructions further cause the one or more processing devices to store vectors including frequencies and restoration costs.

16. A method comprising the steps of:
obtaining a list of restoration paths used for restoring transmission in a network when a home path between an originating node and a termination node is unavailable, the restoration paths being listed in a specific order based on ongoing transmission costs, wherein the ongoing transmission cost for each restoration path is based on characteristics associated with transmitting signals along the respective restoration path, and
reordering the restoration paths in the list based on restoration costs and the ongoing transmission costs, wherein the restoration cost for each restoration path is based on a procedure for switching from the home path to the respective restoration path, wherein the restoration cost of each restoration path is related to a difference between a home frequency associated with the home path and a restoration frequency associated with the respective restoration path.

17. The method of claim 16, wherein the restoration cost is based on a retuning procedure for retuning a modem from the home frequency to the respective restoration frequency when there is frequency contention between the respective restoration frequency and the home frequency, and wherein the restoration cost is based on a time needed to perform the retuning procedure.

18. The method of claim 16, further comprising the steps of:
adding a first parameter to a Layer 0 Control Plane (L0CP) for allowing a user to enable or disable the characteristic for reordering the restoration paths based on restoration costs;
adding a second parameter to the L0CP for allowing the user to enter an acceptable limit for the ongoing transmission costs for the associated restoration paths that have no restoration costs;
wherein the second parameter allows the user to add constraints including one or more of home path diversity, shared path diversity, and maximum ongoing transmission costs.

* * * * *